United States Patent [19]

Kobayashi

[11] 3,800,227

[45] Mar. 26, 1974

[54] PULSE CODE MODULATED SIGNAL SYNCHRONIZER

[75] Inventor: Herbert S. Kobayashi, Webster, Tex.

[73] Assignee: The United States of America as represented by the Administrator of the National Aeronautics and Space Administration, Washington, D.C.

[22] Filed: July 24, 1972

[21] Appl. No.: 274,360

[52] U.S. Cl. .................... 325/320, 325/423, 178/88

[51] Int. Cl. .................... H04l 27/22

[58] Field of Search ............ 325/60, 346, 418, 419, 325/400, 420, 422, 423, 320, 321; 329/50, 122, 123, 124, 125; 178/69.5 R

[56] References Cited

UNITED STATES PATENTS 3,518,680 6/1970 McAulliffe .................... 325/423 X
3,611,144 10/1971 Harmon, Jr. et al............ 325/421 X

*Primary Examiner*—Benedict V. Safourek
*Attorney, Agent, or Firm*—Marvin J. Marnock; Marvin F. Matthews; John R. Manning

[57] ABSTRACT

Disclosed is a bit synchronizer for a split phase PCM transmission including three loop circuits which respectively receive incoming phase coded PCM signals. In the first loop, called a Q-loop, a generated, phase coded, PCM signal is multiplied with the incoming signals, and the frequency and phase of the generated signal are nulled to that of the incoming subcarrier signal. In the second loop, called a B-loop, a circuit multiplies a generated signal with incoming signals to null the phase of the generated signal in a bit phase locked relationship to the incoming signal. In a third loop, called the I-loop, a phase coded PCM signal is multiplied with the incoming signals for decoding the bit information from the PCM signal. A counter means is used for timing of the generated signals and timing of sample intervals for each bit period so that the characteristics of the loops during the sample intervals are used as control signals during a phase locked condition as well as for reaching a phase locked condition.

10 Claims, 6 Drawing Figures

PULSE CODE MODULATED SIGNAL SYNCHRONIZER

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to pulse code synchronizers and, more particularly, to pulse code synchronizers for timing split phase bits for decoding.

Transmission of data involves the choice of a medium or the actual data link and the choice of a format or the code for the transmitted intelligence. The medium for data transmission depends to a large extent on the physical location of the two devices. Where the devices are relatively close to one another, electrical or mechanical means are used. Long distance transmissions are usually accomplished by "radio" which includes all forms of transmission that make use of the principles of electromagnetic radiation such as television, microwave, and radar. In a radio transmission there are typically two components - the carrier wave and the intelligence (or data) signal which is incorporated into the carrier wave. The combining of the carrier wave and the data information for transmission is called modulation and, at the receiving station, the data information is separated from the carrier wave by a process called demodulation.

There are many ways or techniques of combining data information and carrier waves. The present invention concerns itself with the demodulation of a pulse-train carrier with a pulse code and, more particularly, a split phase pulse code modulation. Modulation of a pulse carrier and pulse code is sometimes abbreviated as PCM. The pulse code is typically in a digital format where a series of binary digits (0 or 1) or bits comprise a "word" or data report and a number of words form a "frame" which is a cycle of data compilation. In aerospace telemetry, the data information or intelligence is oftentimes applied to modulate a "subcarrier" which is an intermediate frequency carrier applied as a modulating wave to the principal carrier.

As an example of PCM transmission, a subcarrier frequency can be 8192 Hz. A suitable format is a single frame (a cycle of data compilation) at a rate of 1 Hz where each frame carries 32 words (a data report). Each word can have a reporting capacity of 8 bits (a digital value). Thus, with this example, there is a bit rate of 256 bits per second. In this format, the first and second words of a frame contain a 16-bit frame synchronizing code while the remaining words carry data information. For demodulation, the synchronizer must receive the input signals and synchronize a timing signal with the input signals to minimize the chance of obtaining erroneous information due to noise or intersymbol interference. The synchronizer output can be a serial code with timing signals which are supplied to a decommutator. The decommutator searches for the frame synchronizing pattern and, after acquiring word and frame synchronization, parallel data bits can be decommutated from the serial bit stream of the synchronizer.

SUMMARY OF THE INVENTION

The present invention is embodied in a synchronizer for demodulation of split phase pulse code modulated signals. In this data processing system, incoming data word signals comprised of pulse code modulated bits are demodulated and synchronized by a synchronizer having a frequency stabilizing loop circuit, a phase stabilizing loop circuit, and a decoding loop circuit. Incoming word signals having split phase bit coding in a modulating carrier are applied to each of the loop circuits. The frequency stabilizing loop circuit or Q-loop includes a frequency generating means which supplies pulse signals to a logic circuit which, in turn, provides pulse code modulated signals with a 90° subcarrier phase shift to a multiplier where the PCM signals are multiplied with the incoming signals. The multiplication product is integrated and sampled periodically at regular bit time intervals. The multiplication of these signals produces an error signal which adjusts frequency generating means to the frequency of the incoming subcarrier signal. When the frequency of the frequency generating means is established to that of the subcarrier, there are a number of null points where the error signal to the frequency generating means is stabilized and where the incoming signals and the signals of the frequency generating means are the same. Between the null points, for signals at the same frequency, there is an error signal which increases in relative strength as the generated signal for a bit approaches an in-phase condition relative to an incoming bit.

The output of the frequency generating means is supplied to a shift register counter which provides a timing function relative to the bit period so as to sample each of the loop circuits once for each bit period. During the sampling time, if the incoming bit is not in phase with a bit function produced by the loop circuits, an adjustment is provided. As described above, if the frequency is off, the frequency is adjusted analog-wise and thereafter the same loop provides error signal adjustment which has greater sensitivity of control when the bit periods are in an in-phase condition; i.e., when the incoming signal bit time and the bit synchronizer bit time coincide.

In the bit phase stabilizing loop circuit, a continuous signal from the frequency generating means is multiplied by the incoming signals and provides error signals for each bit period whenever bit the phase of the incoming bit signals become misaligned with respect to the bit phase of the generated bit signals. The error signals are used to adjust the timing of the output signals to the other loops by adjusting the counter position and output of the counter. Therefore, the bit synchronizer phase correction occurs in steps of one sub-carrier cycle and is always in a direction of either toward a true lock point or a false lock point.

In the decoding loop circuit sometimes called an in-phase detecting loop circuit or I-loop, a pulse code modulated signal from a logic circuit is multiplied with the incoming signals. The integrated product is sampled at the end of the bit period and output signals indicative of 0 and 1 digits are produced. A sign correction output is provided for each of the other loops so that for a given word, a correction of frequency or phase is consistent.

DETAILED DESCRIPTION OF THE INVENTION

Figure 1:
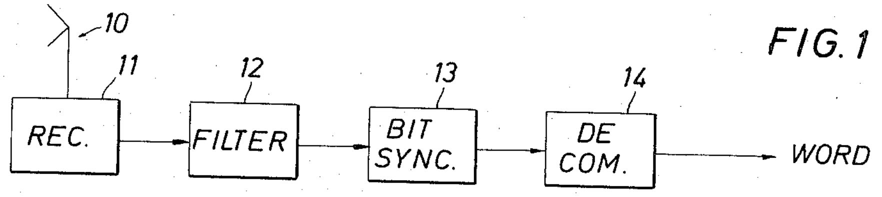
FIG. 1 is a schematic overview of a system embodying the present invention.

Referring to FIG. 1, a station for receiving a radio transmission is schematically illustrated. At the station is an antenna 10 which picks up or detects radio transmission of an electrical signal comprising a Pulse Code Modulated wave train (hereinafter sometimes abbreviated and referred to as PCM). The electrical signals are supplied to a receiver 11 for amplification and detection of the incoming signals. A filter 12 further processes the signals to eliminate undesired signals of other frequencies and noise components. In connection with the present invention, the PCM signal consists of characteristic signal where a number of digital bits (a binary digit 0 or 1) comprise a word and a number of words form a frame and each frame carries coded information or data for a single measurement scan or cycle.

Relative to the pulse coding, each frame carries various data in a fixed relationship, and the first two words are typically used to synchronize the frame, that is, align the pulse input relative to a time base for correctly interpreting the 0 and 1 bits of each word and frame. The proper decoding of a split-phase PCM signal requires that the group of signals constituting words are properly synchronized. Thus, from the filter 12 an incoming signal is supplied to a bit synchronizer 13 which provides an output signal synchronized to the two sync words of a frame. A decommutator 14 receives a properly synced data frame and if any data appears erroneous it is because the data word is wrong and not because of erroneous detection of the input signal.

Figure 2:
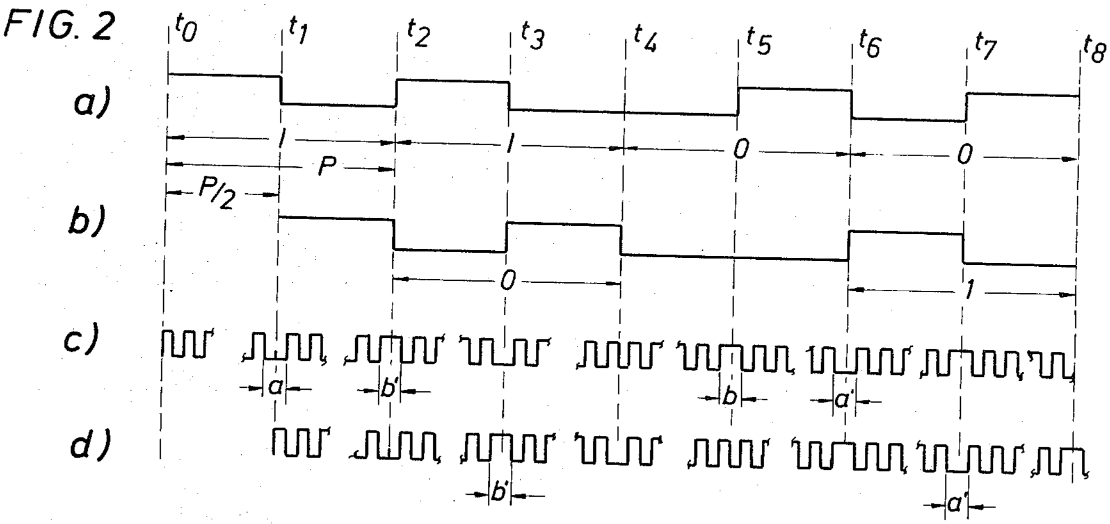
FIG. 2 is a representation of various signal waveforms which are illustrated for explanation purposes.

To illustrate how important synchronization is for this type of decoding, an illustration is provided in FIG. 2. As shown in FIG. 2(*a*), the waveforms between times $t_0$—$t_2$ and $t_2$—$t_4$ illustrate successive digits of value 1 and the waveforms between times $t_4$—$t_6$ and $t_6$—$t_8$ illustrate successive digits of value 0. These waveforms are for split phase coding, i.e., a 1 value for a bit period "P" has an initial half-bit period P/2 in which the signal is positive relative to last half-bit period. A 0 value has just the reverse where the initial half-bit period of the signal is negative relative to the last half-bit period. If the waveform coding is properly synced then the bit synchronizer would have a true lock-up point as indicated by number 57 in FIG. 5. This will be more fully explained later.

In FIG. 2(*b*), the waveform as illustrated in FIG. 2(*a*) is shifted to the right by one-half of the bit time period.

On a time basis, with the same waveform as in FIG. 2(*a*), the bit representation between times $t_2$—$t_4$ and $t_6$—$t_3$ changes value. For example, the 1 value between times $t_2$—$t_4$ changes to a 0 value, and the 0 value between times $t_6$—$t_8$ changes to a 1 value. At the receiving station, if the bit signals are shifted during the detection process, erroneous bit values are produced. As will be appreciated for radio transmission, "noise" is also introduced in the reception signal so that erroneous detection can result. If the waveform coding is as shown in FIG. 2(*b*) then the bit synchronizer would have a false lock-up point as indicated by number 60 in FIG. 5 and this will be more fully explained later.

In FIG. 2(*c*), a split phase signal coding is illustrated with the subcarrier pulses in a format which typically may be a four-bit word at one frame per second. As shown in FIG. 2(*c*), between the times $t_0$ and $t_2$ a single bit representative of the digit 1 is illustrated, and the digit 1 is defined by the occurrence of a phase shift at the time $t_1$ which gives rise to a pulse segment having a pulse width *a* which is twice the width of a regular pulse segment. The pulse segment *a* also represents a lower value of pulse amplitude. Between the times $t_4$ and $t_6$, a single bit representative of the digit 0 is defined by the occurrence of a phase shift at the time $t_5$ which gives rise to a pulse segment having a pulse width *b* which is twice the width of a regular pulse segment. The pulse segment *b* also represents a higher value of pulse amplitude. In FIG. 2(*c*), the digit 1 is defined by the time intervals $t_0$—$t_2$ and $t_2$—$t_4$ and the digit 0 is defined by the time intervals $t_4$— $t_6$ and $t_6$—$t_8$. When two of the 1 digits occur in sequence such as the times $t_0$—$t_2$ and $t_2$—$t_4$ as shown in FIG. 2(*c*), the portion of the pulse train at time $t_2$ between the times $t_1$ and $t_3$ defines a pulse segment *b'* which has the same characteristic as the mid-point pulse segment *b* of an 0 pulse occurring at time $t_5$. Similarly, when two of the 0 digits occur in sequence, such as the times $t_4$—$t_6$ and $t_6$—$t_8$ as shown in FIG. 2(*c*), a pulse segment *a'* occurs at the time $t_6$ and has the same characteristic as the midpoint segment *a* of 1 pulse occurring at time $t_1$.

If the pulse train shifts by one-half the time of bit period *P*, as shown in FIG. 2(*d*), the signal component between the times $t_2$—$t_4$ has the characteristics of a 0 digit, and the signal component between the times $t_6$—$t_8$ has the characteristics of a 1 digit. These deceptive appearances occur whenever two successively alike digits occur in the pulse train; however successive 1's or successive 0's show proper ramp-type integration. Where the integration is not proper is during the interval $t_4$—$t_6$ of FIG. 2(*d*) where the integrated output waveshape looks like a V or inverted V, and results in excessive error detection. Point $t_4$—$t_6$, FIG. 2(*d*), is where the successive 1's change to 0's or successive 0's change to 1's.

With the PCM signal as above described, synchronization of the words is necessary for proper decoding of the signal. Thus, a bit sync circuit 13 (FIG. 1) receives the sync words of a frame and locks the frame in the sync circuit. The decom circuit then receives the bits in proper order and provides the proper word output if the data of the bits is correct. In any event, error due to incoming signal bit time and bit synchronizer being off or shifted is eliminated.

A considerable concern for this type of system is that the input synchronizing word is properly synchronized or locked in proper phase relationship so that the resulting output is correctly interpreted. When synchronization of the input word is obtained, it is desirable to "lock" the reception to prevent drift and "jitter" — i.e., the decom need not be required to reset the bit synchronizer and thus lose input data. By the principle of this disclosure illustrated in FIG. 5 with nulling or locking the system at point 57 the decom is not required to reset the bit synchronizer such that the bit synchronizer bit time coincides with the incoming signal bit time. Thus, the bit synchronization is automatic.

Figure 3:
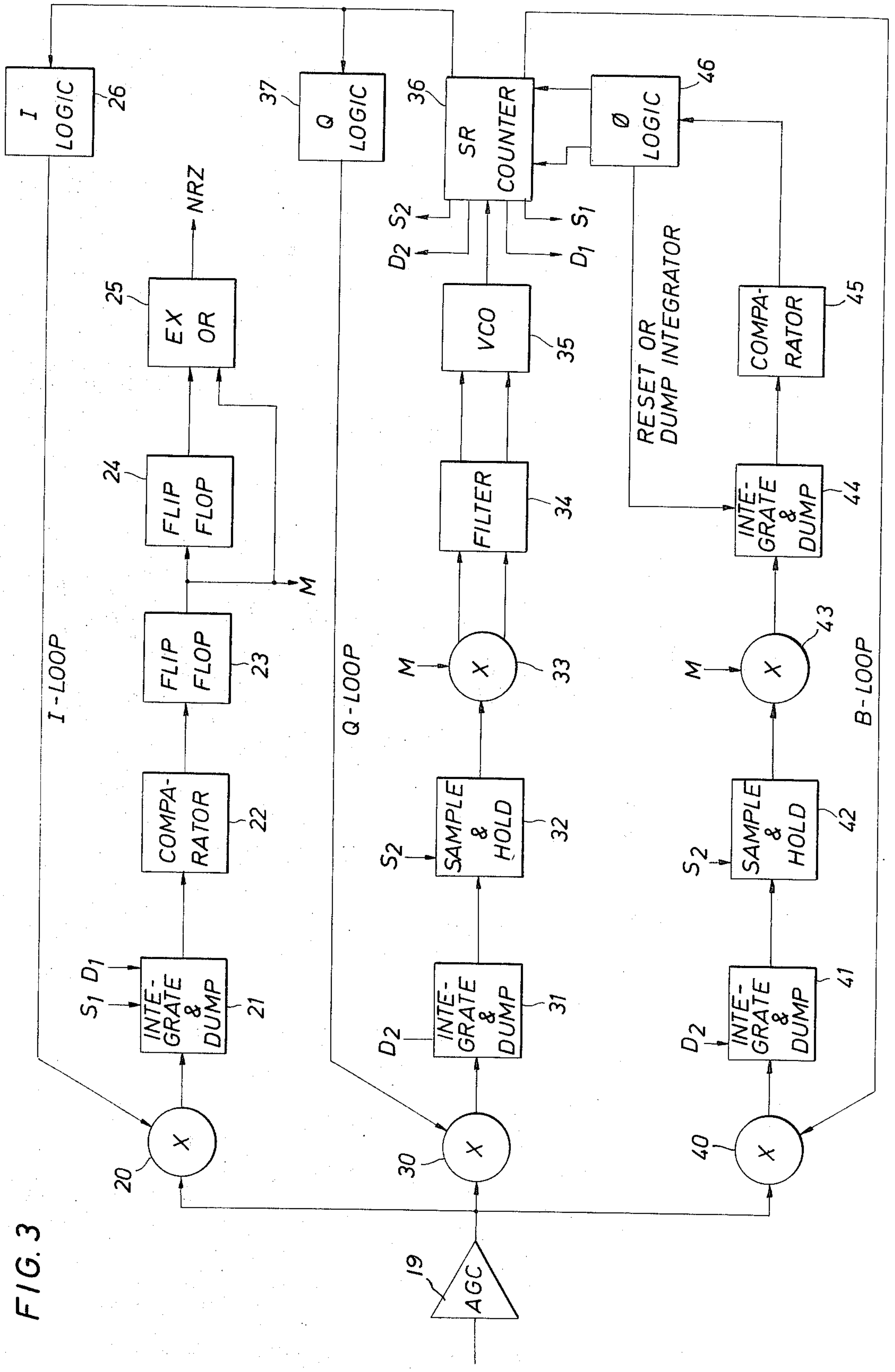
FIG. 3 is a schematic illustration of a circuitry arrangement embodying the present invention.

Referring now to FIG. 3, there is disclosed a bit synchronizing system for PCM signals using split phase bit coding. The system shown in FIG. 3 includes an automatic gain control amplifying circuit 19 which receives an input signal such as a 256 bit-per-second, bi-phase split PCM signal on a coherent 8192 Hz phase shift key (PSK) subcarrier. The signal from the AGC circuit 19 is applied to each of three analog multiplying circuits 20, 30, and 40. Circuit 20 is sometimes hereinafter called the I multiplier as it performs a multiplication of an in-phase generated signal (sometimes hereafter called an I signal) with the input or incoming signals. Circuit 30 is sometimes hereinafter called the Q multiplier as it performs a multiplication of a quadrature signal (a signal shifted 90° with respect to the in-phase generated signal) with the input signals. Circuit 40 is sometimes hereinafter called the B multiplier as it performs a multiplication of a baseband signal (a continuous frequency signal) relative to the input signals. As will hereinafter be more apparent, there is a loop control function involved with each of the multipliers 20, 30, and 40.

The output of the multiplier 20 is supplied to an integrate and dump circuit 21. The multiplier 30 is connected to an integrate and dump circuit 31, and the multiplier 40 is connected to an integrate and dump circuit 41. Each of the integrate and dump circuits 21, 31, and 41 provides for noise rejection in the bandpass. The integrate circuits 21, 31, and 41 are each controlled by a timing signal (sometimes hereafter called a "dump" signal).

In the I loop, the multiplication of locked bit signals provides an output where the potential of the output is indicative of whether the incoming signal is a 0 or 1 bit. A sample period occurs once during each bit period. Thus, at the time of a sample signal to the integrator 21, the voltage level or potential acquired in integrate circuit 21 is supplied to a comparator or threshold level detector 22 which detects whether the bit is a 1 or 0 and provides an output signal to a flip-flop 23. The flip-flop 23 stores the decision (a 0 or 1 bit detected) and this storage, timewise, is just prior to the beginning of a bit period. A second flip-flop 24 and flip-flop 23 along with an exclusive OR gate convert the NRZ-S code to a NRZ-L code for use by a decommutator.

In the Q and B loops are sample and hold circuits 32 and 42 which hold an analog value of the integrate and dump circuits 31 and 41 during the bit period *P* succeeding the bit period detected in the I loop. To do this, the timing of the sampling period is delayed by one bit period in a manner to be explained more fully hereafter. It is during the succeeding bit period that the sample and hold circuits 32 and 42 in the Q and B loops acquire the outputs of the integrators 31 and 41. The outputs of sample circuits 32 and 42 respectively is supplied to analog multipliers 33 and 43 which are responsive to an M output from the flip-flop 23 of the I loop. The M output applied to the multipliers 33 and 43 is a function of a 0 or 1 detection and changes the polarity of the error signal from the sample and hold circuits 32 and 42 as a function of the bit value so that the correction of frequency or phase is in the same direction for either value of the incoming digits.

In the Q loop, the multiplier 33 is output to a filter 34 which, in turn, provides a filtered error control signal to a crystal operated, voltage controlled oscillator 35. The oscillator 35 provides an output signal at the subcarrier frequency to a shift register counter 36.

In the B loop, the multiplier 43 is output to a long-term integrator and a fast dump circuit 44. A comparator or threshold detector circuit 45 detects shifts in the phase of signals as represented by the error output signal from the integrate circuit 44 and operates a phase logic circuit 46 which adds or subtracts one subcarrier cycle per bit period or each B loop detecting period if the integrator 44 output to the comparator 45 exceeds preset values. After the logic circuit 46 receives a comparator signal for a change, the logic circuit 46 issues a reset pulse to the integrator 44 to dump the integrator. During an adjustment, the threshold value of comparator 45 is reached quickly until the phase relationship of the input signal to multiplier 40 is correct with respect to signal output from the counter 36. The B loop continually adjusts itself; however the adjustment period would be long when the bit synchronizer is at null shown in FIG. 5 at point 57. The B loop adjustment will occur quicker off this null since the B loop error from the multiplier 43 and circuit 44 would be larger causing the threshold to be reached more quickly.

Counter 36 is used to output generated signals to the multiplier 40, to a Q logic circuit 37 and to an I logic circuit 26 for the generation of proper signals to the various multipliers 20, 30, and 40. The counter 36 also provides a sampling pulse $S_1$ to the integrator 21, and, at one bit period later, a sampling pulse $S_2$ to the sample circuit 32 and the sample circuit 42. Sampling pulse $S_2$ thus equals sampling pulse $S_1$ minus one bit period. The sampling pulse is generated just prior to the end of a bit period. The dump pulse $D_1$ and $D_2$ are provided to the integrators 21, 31, and 41 at the end of each bit period following the $S_1$ and $S_2$ pulses. Thus the system provides for sampling for a discrete period of time and adjustment of the timing of a generated signal to an incoming signal to synchronize the signals for proper decoding.

In more detail, the voltage control oscillator 35 generates a square shaped pulse signal at a frequency which is a function of the amplitude level of a control input voltage from filter 34. The voltage controlled oscillator (VCO) 35, in turn, supplies a square shaped pulse output to the shift register counter 36 which counts the input pulses from VCO 35. After a predetermined number of pulses from the VCO 35, counter 36 produces a sample signal $S_1$ to actuate the I loop and, subsequently, produces a dump or reset signal $D_1$ to clear the integrator 21. At one bit period later, a sample signal $S_2$ is supplied to sample circuits 32 and 42 and the subsequent dump signal $D_2$ (one bit period later than dump pulse $D_1$) is supplied to the integrators 21 and 41. Clearing the integrators re-establishes initial conditions for each of the bits and bit periods. Passing through the counter 36 are pulses from the VCO 35 which are applied to the I logic circuit 26, the Q logic circuit 37 and the B circuit multiplier 40.

Figures 4, 6:
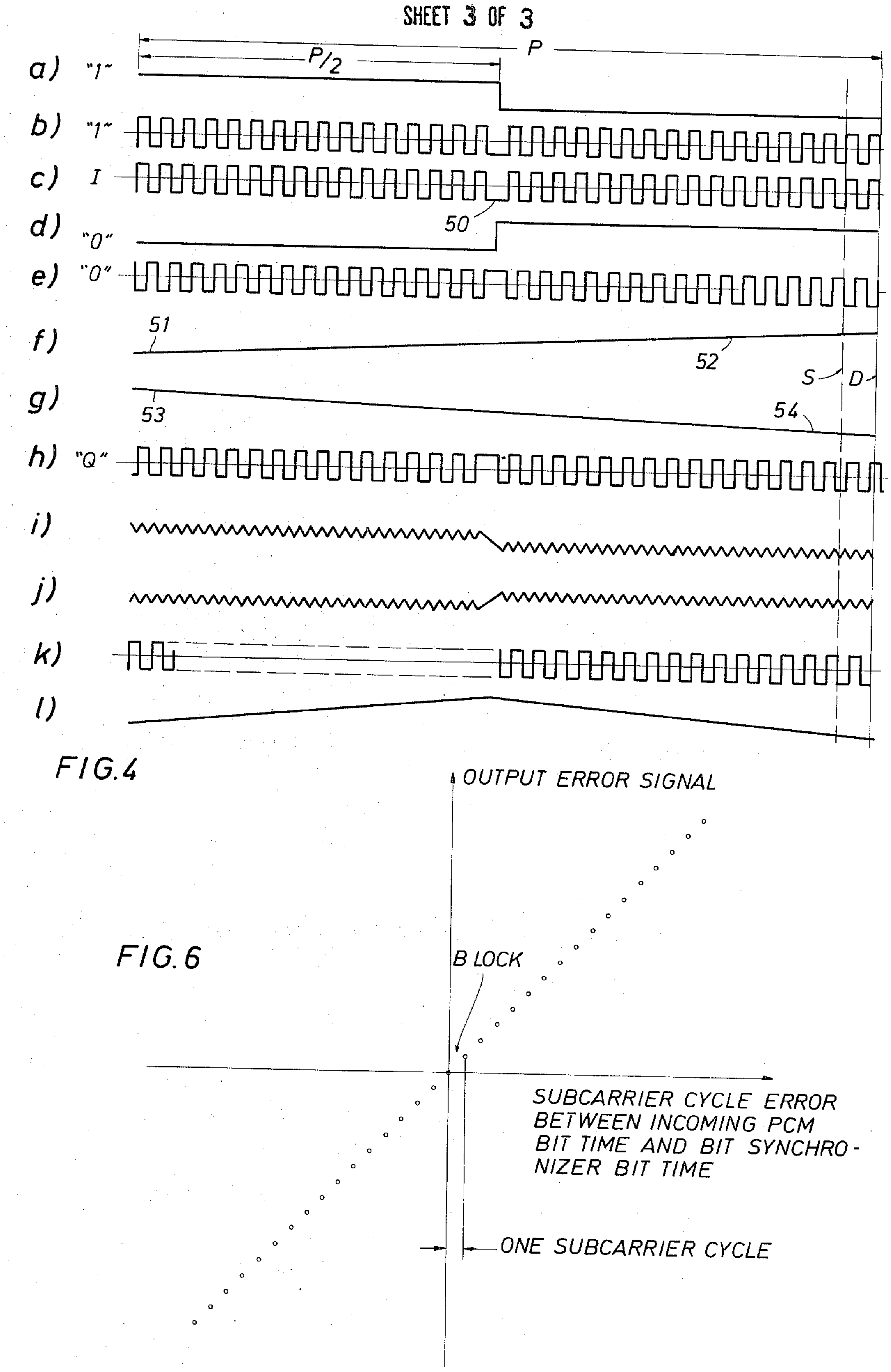
FIG. 4 is a representation of various signal waveforms for the circuitry of FIG. 3.
FIG. 6 is a plot of B-loop output phase error signals as a function of subcarrier cycle error between the incoming signal bit time and the bit synchronizer bit time.

Referring now to FIG. 4, certain waveforms are illustrated which are intended to simplify the explanation of the system. In FIGS. 4(*a*) and 4(*d*), digital bit values of 1 and 0 are illustrated as electrical voltages. The digital bit value of 1 in FIG. 4(*a*) has a bit time period *P* and the initial half period P/2 is a positive voltage relative to the voltage of the final half-period. The digital bit value of 0 in FIG. 4(*d*) has a similar bit time period *P* but the initial half-period P/2 is a negative voltage relative to the voltage of the final half-period. In FIG. 4(*b*) a bit value of 1 modulated with a subcarrier frequency is illustrated, and in FIG. 4(*e*) a bit value of 0 modulated with a subcarrier frequency is illustrated.

Turning now to the I logic circuit 26, it consists of a number of gates arranged to receive outputs from counter 36 and produce a train of output pulses which are characteristic of a 1 pulse for a bit in a split phase form. This pulse train, as illustrated in FIG. 4(*c*), consists of sixteen consecutive pulses with similar widths, and at the mid-point of the bit period a phase change produces a pulse 50 having a width twice that of the other pulses of the train. The pulse 40 is followed by 16 consecutive pulses. The I signal of FIG. 4(*c*) is produced by the I logic circuit 26 in a conventional manner.

The output of the I logic circuit 36 is supplied to the analog multiplier circuit 20 where the I signal is multiplied algebraically with the incoming signal (which can be a 0 or 1). From a consideration of FIGS. 4(*b*) and 4(*c*), multiplication of a 1 signal by a 1 or I signal gives a positive signal output for the entire bit period p in that a (+) times a (+) gives a positive value and a (−) times a (−) gives a positive value. From a consideration of FIGS. 4(*e*) and 4(*c*), multiplication of a 0 signal by a 1 or I signal gives a negative or lower value signal output for the entire period in that the (+) times a (−) gives a negative value.

The output from the multiplier 20 is supplied to the integrate and dump circuit 21 which integrates the signal. As shown in FIG. 4(*f*) when a 1 and the I signals are multiplied the voltage level rises from a low level at 51 to a higher level at 52. As shown in FIG. 4(*g*) when a 0 and the I signal are multiplied the voltage level drops from a higher level at 53 to a lower level at 54. Thus, between the sample and dump times (lines S and D of FIG. 4) the comparator 22 can sense the integrated value and provide a responsive output signal to the flip-flop 23. Flip-flop 23 provides an output to flip-flop 24 and also to an exclusive OR circuit 25. Circuit 25 also is input from flip-flop 24. This arrangement provides an output from the OR circuit 24 which is a 1 or a 0 signal whenever the multiplied I and 1 signals are properly synced as in FIGS. 4(*b*) and 4(*c*) and whenever the multiplied I and 0 signals are properly synced as in FIGS. 4(*c*) and 4(*e*). This synchronization is not only of frequency but also with respect to the cycle of the subcarrier frequency.

The B loop and the Q loop are provided to keep the foregoing described synchronization in the I loop. The Q loop provides for frequency and/or phase synchronization within the subcarrier cycle while the B loop provides for phase synchronization with respect to the bit period.

In the Q loop circuit which establishes the frequency lock-up with incoming signals, the incoming signal is multiplied with a generated Q signal having a 0 pulse characteristic and a carrier phase shift of 90° with respect to the reference or in-phase I signal (which has a 1 pulse characteristic). With the incoming signal and the Q signal at the same frequency, and 32 pulses in a bit, there is a center null point where the multiplication of the incoming signal with a 0 pulse signal in the multiplier 30 will produce a zero or null output. If the cycles of the frequency of the incoming signal lag or lead with respect to the Q signal at each point of cycle registry, the output of the multiplier 30 is null. Thus, for the example discussed in this application, the incoming signal can be nulled with the Q signal for 16 cycles of relative lead or lag between the incoming and Q signals. It should be noted that the Q signal sensitivity is the greatest at point 57 of FIG. 5.

Figure 5:
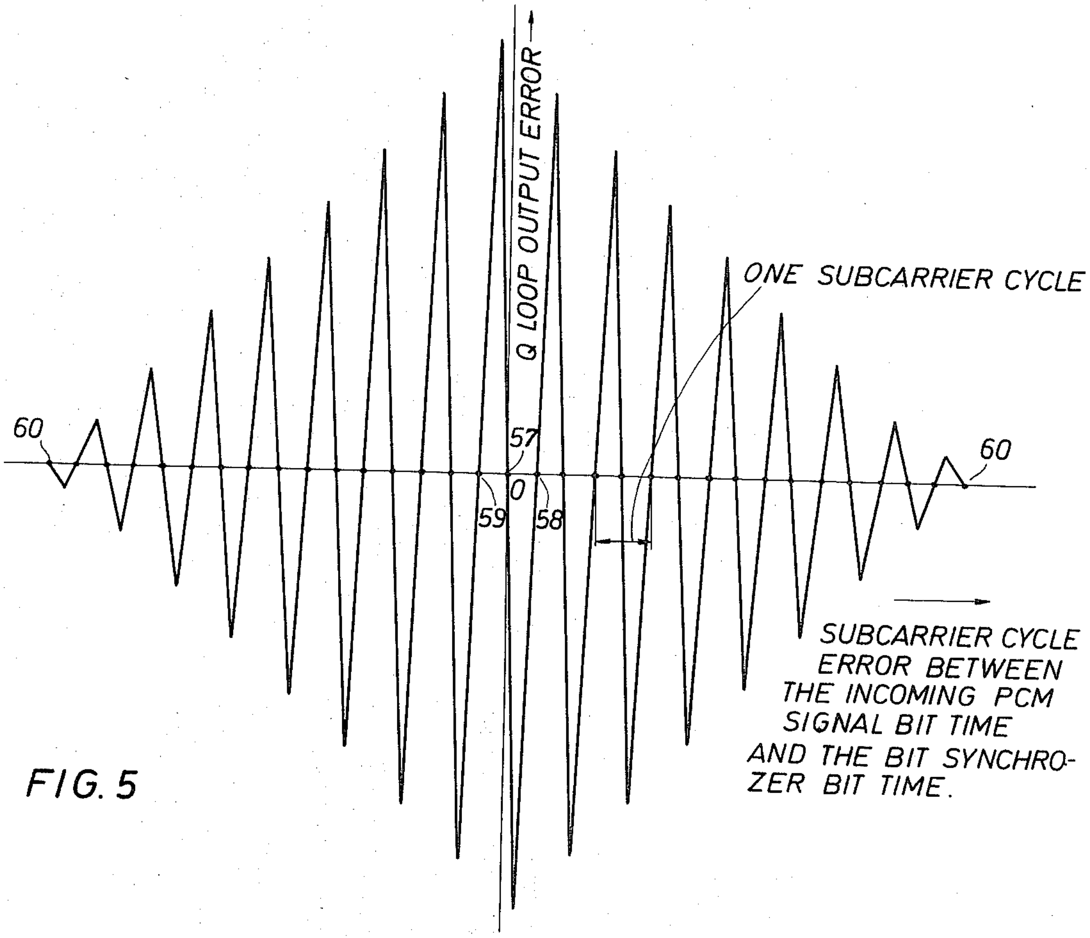
FIG. 5 is a plot of Q-loop output phase error signals as a function of subcarrier cycle error between the incoming PCM signal bit time and the bit synchronizer bit time.

Referring to FIG. 5, a plot of relative outputs of integrator 31 is illustrated where the X or horizontal axis is a zero or null output and the Y or vertical axis illustrates relative magnitude values for the integrator output. As illustrated, between a center null point 57 and a null point 58 to the right, a maximum negative error amplitude occurs, and between the center null point 57 and a null point 59 to the left, a maximum positive error amplitude occurs. As the cycle error increases, the amplitude of the integrator output decreases with a minimum magnitude at point 60. The B loop takes the Q loop out of all nulls on FIG. 5 except points 57 and 60. Because the sensitivity of the Q loop is too low at point 60, the B and Q loops makes the bits synchronizer operate only at point 57.

With reference to FIG. 4(*h*), a Q signal is illustrated. As previously described, the Q signal has a 0 characteristic but is shifted by 90° relative to the phase of an I signal. Multiplication of the Q signal with a 1 signal and integration results in a waveform as illustrated in FIG. 4(*i*) whenever the 1 and Q signal are properly synced. Multiplication of the Q signal with a 0 signal and integration results in a waveform as illustrated in FIG. 4(*j*) whenever the 0 and Q signals are properly synced. The sample circuit 32 during the sample and dump period provides an output signal to the multiplier 33 which is corrected for either a 0 or 1 so that the direction of the correction is the same for either a 0 or a 1. The VCO 35 is driven as a function of the deviation of the signals from the established sync values.

Refering again to FIG. 3, the counter 36 also generates a continuous pulse train B as shown in FIG. 4(*k*). The pulse train of FIG. 4(*k*) is multiplied with the incoming signal and the multiplied product, when integrated by the integrator circuit 41, provides positive output signals to the mid-points of the 1 signals and thereafter the sign of the output signal goes negative as shown in FIG. 4(*l*). Thus, the integrator circuit 41 responds to the multiplied incoming signals and B signals to provide an integrated signal for both 0 and 1 digits with the signal waveform of the integrated product involving a 0 pulse train being the inverse of the waveform of the integrated product involving a 1 pulse train. The output of the integrator is supplied to a multiplying circuit 43 which corrects the integrator output for 0 and 1 signals. From circuit 43, the signals are supplied to a long-term integrator 44, which accumulates several bit phase errors. The integrator provides an integrated output signal to a comparator 45. The comparator circuit 45 is arranged to provide for a one subcarrier cycle phase shift and the integrator of integrator 44 is dumped whenever there is a lock of the bit signal in the B and Q circuits.

As shown by the plot of FIG. 6, the X axis therein indicates phase error both positive and negative relative to a null point along the X-axis. As the degree of phase error increases, the error amplitude increases — the error being positive for a positive phase error and negative for a negative phase error. The output of the phase logic circuit 46 adjusts the phase of the counter 36 to null the B signal with the incoming signal.

Relative to the operation of the present invention, it will be recalled that the purpose of the invention is to detect pulse code modulated signals with less error due to noise and to eliminate any false lock problems. To do this, the Q loop comprised of the multiplier 30, integrator 31, sample circuit 32, multiplier 33, filter 34, VCO 35, counter 36, and Q logic circuit 37 serves to adjust the relative timing of a generated split phase signal to the timing of the incoming signal so that the frequency of each of the signals are in sync. The B loop comprised of the multiplier 40, integrator 41, sample circuit 42, multiplier 43, integrator 44, comparator 45, phase logic circuit 46 and counter 36 serves to adjust the relative timing of a generated split phase signal to the timing of the incoming signal so that the phase of each of the signals is in sync.

The VCO 35 in the Q loop provides a continuous signal at the PCM subcarrier frequency to the counter 36. The continuous signal from the VCO 35 is supplied to the counter 36 to regulate a sampling period defined between dump and sample signals for each bit period. The continuous signal from VCO 35 also is supplied to an I logic circuit 26 and a Q logic circuit 37. The I logic circuit 26 generates a signal representative of a 1 digit in a split phase mode at the subcarrier frequency. The Q logic circuit 37 generates a signal representative of a 0 digit in a split phase mode at the subcarrier frequency but displaced by 90° relative to the timing of the I signal.

The Q signal is multiplied with an incoming signal at the multiplier 30. If the Q signal and incoming signal have relative alignment of the mid-portions of a bit signal representation, the output of the integrator 31, when sampled, will be as illustrated in FIGS. 4(*f*) and 4(*g*). The M signal from the I loop controls multiplier 33 so that for either a 0 and 1, the relative voltage control supplied to the VCO 35 is the same. When there is relative alignment subcarrier frequency, the output signal from multiplier 33 maintains the output of VCO 35 constant at the subcarrier frequency. If there is a relative misalignment of the subcarrier cycles of the Q signal and incoming signal, as illustrated in FIG. 5, an error signal is produced to adjust the VCO 35 to null the error signal at points along the X-axis of FIG. 5. At any of the null points other than the center null point 57 and point 60, however, the B loop will provide a correction signal so that the Q signal can be constantly adjusted toward the null point 57 or point 60 by the B loop until the null point 57 or point 60 is reached. However, the null point 57 is reached in this design because the Q loop sensitivity is greater at point 57 (maximum) than it is at point 60 (minimum).

In the B loop, a continuous signal at the subcarrier frequency supplied by the VCO 35 is multiplied with the incoming signals by the multiplier 40. If the incoming signal is properly phased, the integrator 41 receives a relatively low level signal during the sampling period, as illustrated in FIG. 4(*l*). The multiplier 43 performs the function of keeping the correction for a 0 or 1 on the same polarity. Integrator 44 operates over a number of cycles before the threshold value for the comparator 45 is exceeded. The phase logic circuit operates to advance or retract the position of the digits in the counter 36 so as to adjust the relative phase one subcarrier cycle at a time.

In the I loop, the signal generated by the I logic circuit 26 is multiplied with the incoming signal by the multiplier 20. During the sampling period, the value of the digit is determined and the comparator 22 operates the flip-flop 24 and OR circuit 25 to provide the digit indication.

With the foregoing system, the PCM signal is sensed by the synchronizer and the frequency of the generated signal is adjusted to that of the incoming signal. Thereafter, the bit time of the generated signal is synchronized to that of the incoming signals.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. In a data processing system which receives incoming data word signals of a subcarrier frequency, said signals comprised of bits, each bit having a phase code modulation characteristic indicative of a digit value for a bit, means for demodulating said data word signals and for synchronizing the bits of an incoming word relative to the phase code modulation characteristics, said demodulating and synchronizing means including:

frequency stabilizing circuit means having a signal generator for generating a square wave output signal of said subcarrier frequency, first signal developing means responsive to said signal generator output signal for developing first phase coded modulation signals from said generated output signal wherein said phase coded modulation signals are comprised of bits, first combining means coupled to said first signal developing means for combining said incoming word signals with said first phase coded modulation signals producing first error signals as a function of frequency and phase deviation between said incoming data word signals and said first phase coded modulation signals, and a first adjustment means responsive to said first error signals for periodically adjusting the frequency and phase output of said signal generator to that of said incoming signals;

bit phase stabilizing circuit means having a second combining means coupled to said signal generator for combining said incoming data word signals with the square wave output signal from said signal generator and producing second error signals as a function of bit phase deviation between the bits of said incoming word signals and the bits of said first phase coded modulation signals, said first adjustment means including a detecting circuit means having a second signal developing means for developing second phase coded modulation signals as a function of the frequency output of said signal generator, a third combining means coupled to said second signal developing means for combining said incoming data word signals with said second phase coded modulation signals for demodulating said incoming word signals, and means coupled to said third combining means for detecting the phase code characteristics of said demodulated incoming word signals and for producing output signals indicative of digit valves for each bit, said bit phase stabilizing circuit including a second error signals for periodically adjusting the bit phase of said first and second phase coded modulation signals to the bits of the incoming signals whereby the system is operative to provide bit synchronization without a flase lock.

2. The data processing system as defined in claim 1 and further including in said frequency stabilizing circuit means a shift register counter coupled to said signal generator means, said first signal developing means, said second combining means and said second signal developing means.

3. The data processing system as defined in claim 2 wherein said counter means is coupled to each of said circuit means for sampling during a discrete time interval for each bit period.

4. The data processing system as defined in claim 3 wherein said discrete time from said counter means extends over the end and beginning of a bit period.

5. The data processing system as defined in claim 4 wherein said first phase coded modulation signals have a 0 bit characteristic and are phase shifted by 90° and said second phase coded modulation signals have a 1 bit characteristic.

6. The data processing system as defined in claim 5 wherein said second adjusting means of said bit phase stabilizing circuit means is coupled to said counter means for shifting said modulation signals relative to a timing base.

7. In a data processing system which receives incoming data word signals comprised of bits which are phase coded in a pulse transmission signal, each bit having a phase code modulation characteristic indicative of a digit value for a bit, means for demodulating said data word and for synchronizing the bits of an incoming word relative to the phase code modulation characteristic including a source of signals, first mixing means coupled to said source of signals for providing first phase coded signals from the source signals and mixing the first phase coded signals with incoming data word signals, frequency and phase error detecting means coupled to said first mixing means for nulling the frequency of the first generated phase coded signals to that of the incoming data word signals, second mixing means coupled to said source of signals for receiving signals from said source of signals and for receiving incoming data word signals and mixing said source signals and incoming signals, third mixing means coupled to said source of signals for providing second generated phase coded signals from the source signals and mixing the second phase coded signals with incoming word signals, demodulating means coupled to said third mixing means for demodulating the incoming data word signals, bit phase error detecting means coupled to said second mixing means for detecting bit phase error between the bits of the incoming signals and said generated phase coded signals, and sampling means being coupled to said frequency and each said phase error detecting means and said demodulating means for sampling the mixed signals once for each bit period, whereby said detecting means and demodulating means are operative to periodically adjust said source of signals to provide a phase and frequency lock between said incoming data word signals and signals from said source of signals.

8. The data processing system of claim 7 wherein said data word signals are split phase coded.

9. The data processing system of claim 7 wherein said source of signals includes a shift register counter.

10. In a data processing system which receives incoming PCM signals comprised of bits with 0 or 1 characteristics, each bit having a phase code modulation characteristic indicative of a digit value for a bit, means for demodulating said PCM signals and for synchronizing the bit coding of an incoming word relative to its phase code modulation characteristic including:

a source of incoming PCM signals, frequency stabilizing means having a voltage controlled signal generator, a shift register counter coupled to the output of said signal generator, a first logic circuit coupled to said counter for developing a PCM signal having a 0 characteristic and a phase shift of 90° relative to a PCM signal having a 1 characteristic, first multiplying means coupled to said first logic circuit and said signal source for combining signals, first integrating means coupled to said first multiplying means for integrating the signal output from said first multiplying means, first sampling circuit means coupled to said first integrating means, a first digit multiplier circuit coupled to said first sampling circuit means, means coupling said first digit multiplier circuit to said voltage controlled signal generator, bit phase stabilizing means having second multiplying means coupled between said counter circuit and said signal source for combining signals, second integrator means coupled to said second multiplying means for integrating the signal output from said second multiplying means, second sampling circuit means coupled to said second integrator means, a second digit multiplier circuit coupled to said second sampling circuit means, third integrator means coupled to said second digit multiplier circuit, first threshold detector means coupled to said third integrator means for producing output signals, a second logic circuit coupled to said first threshold detector means and said counter for advancing or retracting the counter output signals, means having a third logic circuit coupled to said counter for developing a PCM signal having a 1 characteristic, third multiplying means coupled to said third logic circuit and said signal source for combining signals, fourth integrator means coupled to said third multiplying means for integrating the signal output from said third multiplying means, second threshold detector means for determining a 0 or 1 signal, and circuit means coupled to said second threshold detector for operating said first and second digit multiplier circuits for maintaining polarity of a signal from such multiplier circuits.

* * * * *